(12) United States Patent
Xia et al.

(10) Patent No.: US 6,487,282 B1
(45) Date of Patent: Nov. 26, 2002

(54) APPARATUS AND METHOD FOR AN INBOUND TELEMETRY DEVICE TO SENSE TELEPHONE LINE STATUS

(75) Inventors: Yongping Xia, Torrance, CA (US); Joshua S. Zhu, Torrance, CA (US)

(73) Assignee: FirstPoint Energy Corp., Portland, OR (US)

( * ) Notice: Subject to any disclaimer, the term of this patent is extended or adjusted under 35 U.S.C. 154(b) by 0 days.

(21) Appl. No.: 09/628,849

(22) Filed: Jul. 31, 2000

(51) Int. Cl.[7] .............................................. H04M 11/00
(52) U.S. Cl. ............................ 379/106.03; 379/106.01; 379/106.08
(58) Field of Search ...................... 379/106.03, 106.01, 379/93.05, 106.08, 90.01, 93.28, 93.07, 93.09

(56) References Cited

U.S. PATENT DOCUMENTS

| | | |
|---|---|---|
| 4,180,709 A | 12/1979 | Cosgrove et al. |
| 4,489,220 A | 12/1984 | Oliver |
| 4,540,849 A | 9/1985 | Oliver |
| 4,578,536 A | 3/1986 | Oliver et al. |
| 4,646,342 A | 2/1987 | Hargrave et al. |
| 4,654,868 A | 3/1987 | Shelley |
| 4,654,869 A | 3/1987 | Smith et al. |
| 4,710,919 A | 12/1987 | Oliver et al. |
| 4,833,618 A | 5/1989 | Verma et al. |
| 4,839,917 A | 6/1989 | Oliver |
| 4,866,761 A | 9/1989 | Thornborough et al. |
| 4,958,371 A * | 9/1990 | Damoci et al. ........ 379/106.08 |
| 5,134,650 A | 7/1992 | Blackmon |
| 5,189,694 A | 2/1993 | Garland |
| 5,197,095 A | 3/1993 | Bonnet et al. |
| 5,202,916 A | 4/1993 | Oliver |
| 5,204,896 A | 4/1993 | Oliver |
| 5,235,634 A | 8/1993 | Oliver |
| 5,243,644 A | 9/1993 | Garland et al. |
| 5,311,581 A | 5/1994 | Merriam et al. |
| 5,377,260 A | 12/1994 | Long |
| 5,434,911 A | 7/1995 | Gray et al. |
| 5,454,031 A | 9/1995 | Gray et al. |
| 5,485,509 A | 1/1996 | Oliver |
| 5,488,654 A | 1/1996 | Oliver |
| 5,677,947 A | 10/1997 | Oliver |
| 5,682,422 A | 10/1997 | Oliver |

OTHER PUBLICATIONS

"Outline Specification For A Meter Interface Unit for use with PSTN No Ring Calls" by K. E. Nolde BT Laboratories, May 8, 1993.

* cited by examiner

Primary Examiner—Melur Ramakrishnaiah
(74) Attorney, Agent, or Firm—ReedSmith LLP; Thomas J. McWilliams (57) ABSTRACT

A telephone-based automatic meter reading (AMR) system includes a telemetry device through which a host computer can collect meter readings remotely. So that the telemetry device does not interfere with customer usage of other telephone devices on the telephone line, an apparatus and method is provided which enables the telemetry device to sense both the static off-hook status and the dynamic off-hook status of the telephone line. Numerous circuit components in the telemetry device are shared in sensing both the static and the dynamic off-hook status. Whenever it is determined that a telephone device is, or has become, off-hook, the telemetry device is prevented from using the telephone line. Isolation between the telephone line and the meters is ensured using a transformer and optocouplers.

9 Claims, 5 Drawing Sheets

APPARATUS AND METHOD FOR AN INBOUND TELEMETRY DEVICE TO SENSE TELEPHONE LINE STATUS

TECHNICAL FIELD OF THE INVENTION

The present invention relates generally to a data collection system with remote units for telemetrically transferring data to a central processing location, and more particularly, to an automatic meter reading (AMR) system in which conventional subscriber telephone lines are used to transfer collected data (e.g., utility meter readings) from a customer's premises to a central processor.

BACKGROUND OF THE INVENTION

Figure 1A:
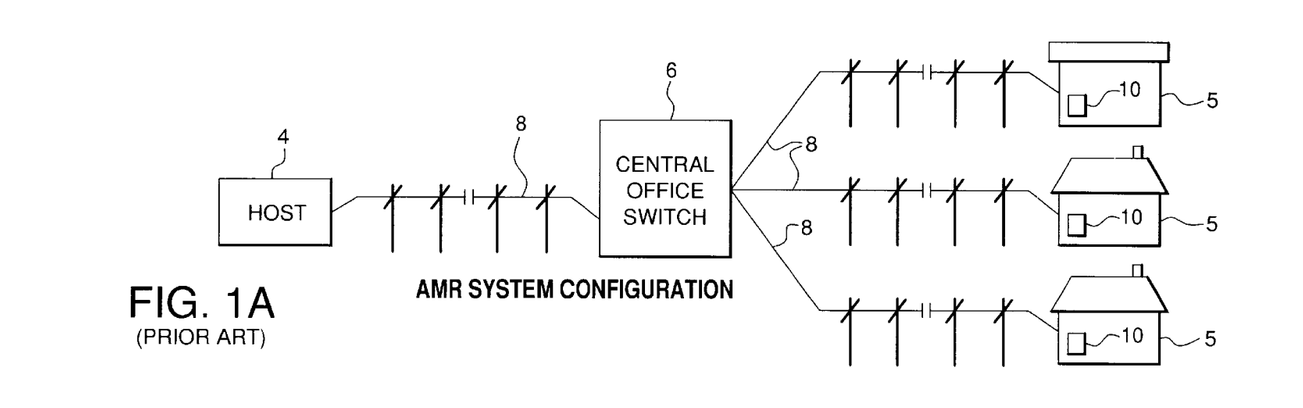
FIG. 1A is a block diagram of a conventional AMR system.
Figure 1B:
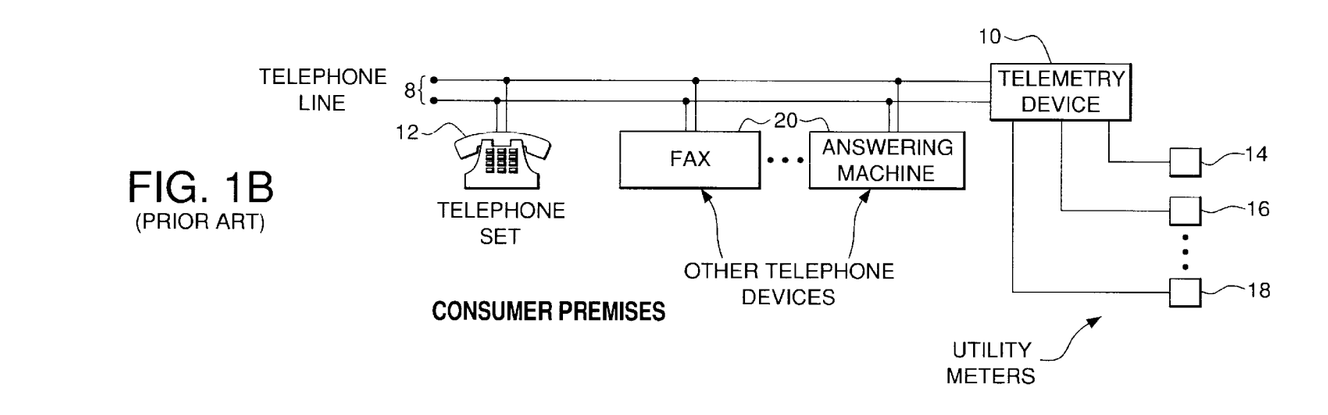
FIG. 1B is a block diagram of conventional telephone device equipment, including an MIU telemetry device, located at the utility customer's premises.

A traditional way to collect data from utility meters (e.g., gas, electric, water) at customer sites is to send a person to read the respective meters periodically. An automatic meter reading (AMR) system, as illustrated in FIGS. 1A and 1B, changes this labor intensive data collection procedure. With an AMR system, utility companies not only can reduce the number of necessary meter reading personnel, but also can get more information from the meters. For instance, an AMR system can be set to record the meter data every 15 minutes or so and store the data in memory. A processing center or host computer can then periodically retrieve and analyze the collected data, such that the information may be used to compile peak time and maximum usage statistics, to work with a customer to establish rates, to notify the customer if an abnormal usage is identified, and ultimately to provide better customer services.

Since telephone infrastructure has been established for many years and reaches almost every corner of the country, it is one of the logical choices to use as the AMR system communication means. A typical AMR system configuration is shown in FIG. 1A where a utility company (or meter reading service) utilizes a host computer system 4 to collect data from a plurality of consumers (homes, apartments, businesses, etc.) over the existing telephone system. In certain applications, the host computer system may be co-resident with a telephone central office switch 6 or it may be remotely located (as shown), appearing as just another subscriber telephone line 8 to the central office switch 6. At each consumption point, a telephone line telemetry device 10 is connected to one or more utility meters (not shown), thereby making the meters electronically accessible to a host computer system via the existing public telephone network.

As shown in more detail in FIG. 1B, the design of telemetry device 10 is such that it operates over the same telephone line 8 as the subscriber's telephone set 12 so there is no need for additional phone lines or infrastructure. In AMR applications, the telemetry device 10 is called a meter interface unit (MIU) or telemetry interface unit (TIU), since the device serves as an interface between two different electrical environments. One side of MIU telemetry device 10, called the meter side, is connected to one or more utility meters 14, 16, 18, while the remaining side of the MIU is connected in parallel across the subscriber telephone line 8. With regard to the telephone-line-side of the MIU, the connection is electrically equivalent to the homeowner plugging in an additional telephone or answering machine, and telemetry device 10 appears in parallel with the other telephone devices 20 which are connected to the phone line. As shown in FIG. 1B, other than connecting MIU 10 to the subscriber line, no modification of the existing telephone line wiring is required.

The MIU telemetry device 10 can be designed to share the telephone line in a manner creating no interference for the customer. If a customer is using the phone 12 or the facsimile machine 20, a static off-hook detection system in the MIU device detects that the phone line 8 is not then available, and a call back to the host computer 4 (FIG. 1A) will not occur immediately, even though a scheduled call back time has been reached. Once the phone line becomes available, the device initiates a call to the host computer. The MIU dials automatically pursuant to a calling schedule and availability of the phone line, uploads the accumulated meter data to the host computer, and then turns itself off to again release the phone line. If the customer wants to use the phone while the MIU device is communicating with the host computer, a dynamic off-hook detection system in the MIU detects this and immediately releases the phone line. As a result of these detection systems, the MIU is transparent to the customer during normal operation. Use by the MIU device of a toll-free 800 number to call the host computer and transfer meter data over the existing telephone line infrastructure further ensures that this is a zero impact event to the customer.

Typically, static off-hook detection has been accomplished using a voltage comparator. However, it has proven difficult to isolate the phone side and the meter side of the MIU device because the output from the voltage comparator is a weak DC signal. Moreover, since there are two different phone systems in wide use (24V and 48V), a jumper has to be used to accommodate the different voltages. In the present invention, a new apparatus and method are used to monitor the telephone line conditions. Utilizing a combination of hardware components and the firmware in a microcontroller, the static on/off hook status of the phone line is monitored, and the microcontroller reacts to the sensed information according to predetermined procedures. This new system eliminates the voltage comparator, and since a fixed voltage level is not being detected, the jumper previously needed to accommodate the two prevalent phone systems is no longer necessary.

With respect to dynamic off-hook detection, the present invention likewise utilizes a combination of hardware components (including an optocoupler isolated switch) and the firmware in the microcontroller to monitor both the dynamic on/off hook status and dynamic change of the phone line voltage. Previously, two microcontrollers (one for the phone side of the MIU device and one for the meter side) were needed to handle the isolation problems.

Since the MIU device is physically connected both to utility meters and a telephone line, a certain breakdown voltage (>1500V) is required between the telephone terminal and the meter terminals. In this device, a high voltage transformer and optocouplers are used to ensure that the breakdown voltage exceeds the requirement.

SUMMARY OF THE INVENTION

Accordingly, one object of the present invention is to provide an MIU telemetry device having an improved apparatus and method for detecting the static off-hook status of the telephone line, wherein the detection of a fixed voltage level is not performed.

Another object of the present invention is to provide such an MIU telemetry device which further utilizes an optocoupler isolated switch as part of the components that monitor the dynamic off-hook status of the telephone line.

Yet another object of the present invention is to provide such an MIU telemetry device in which numerous circuit components are shared in the monitoring of both the static off-hook status and the dynamic off-hook status of the telephone line.

In accordance with a preferred embodiment of the present invention, there is provided an MIU telemetry device for collecting information at a remote location and transmitting the information over a telephone line to a host station, the telemetry device comprising a monitoring circuit coupled to the telephone line which periodically generates a voltage signal having an amplitude that is representative of the telephone line voltage, a pulse-generating circuit (comprising a voltage detector and an optocoupler) which converts the voltage signals into a stream of binary signals (wherein each binary signal has either a first logic level or a second logic level, and the binary signals having said first logic level are of variable duration), and a microcontroller which analyzes the stream of binary signals to determine whether the stream has ceased having binary signals of both said first logic level and said second logic level (wherein the telemetry device is prevented from transmitting over the telephone line) and/or whether the respective durations of two non-consecutive binary signals having said first logic level differ by more than a predetermined amount (wherein the telemetry device is required to stop transmitting over the telephone line).

BRIEF DESCRIPTION OF THE DRAWINGS

The detailed description particularly refers to the accompanying figures, in which.

DETAILED DESCRIPTION OF THE INVENTION

While the invention will be described in connection with certain preferred embodiments, it will be understood that it is not intended to limit the invention to these particular embodiments. On the contrary, it is intended to cover all alternatives, modifications and equivalents included within the spirit and scope of the invention as defined by the appended claims.

Figure 2:
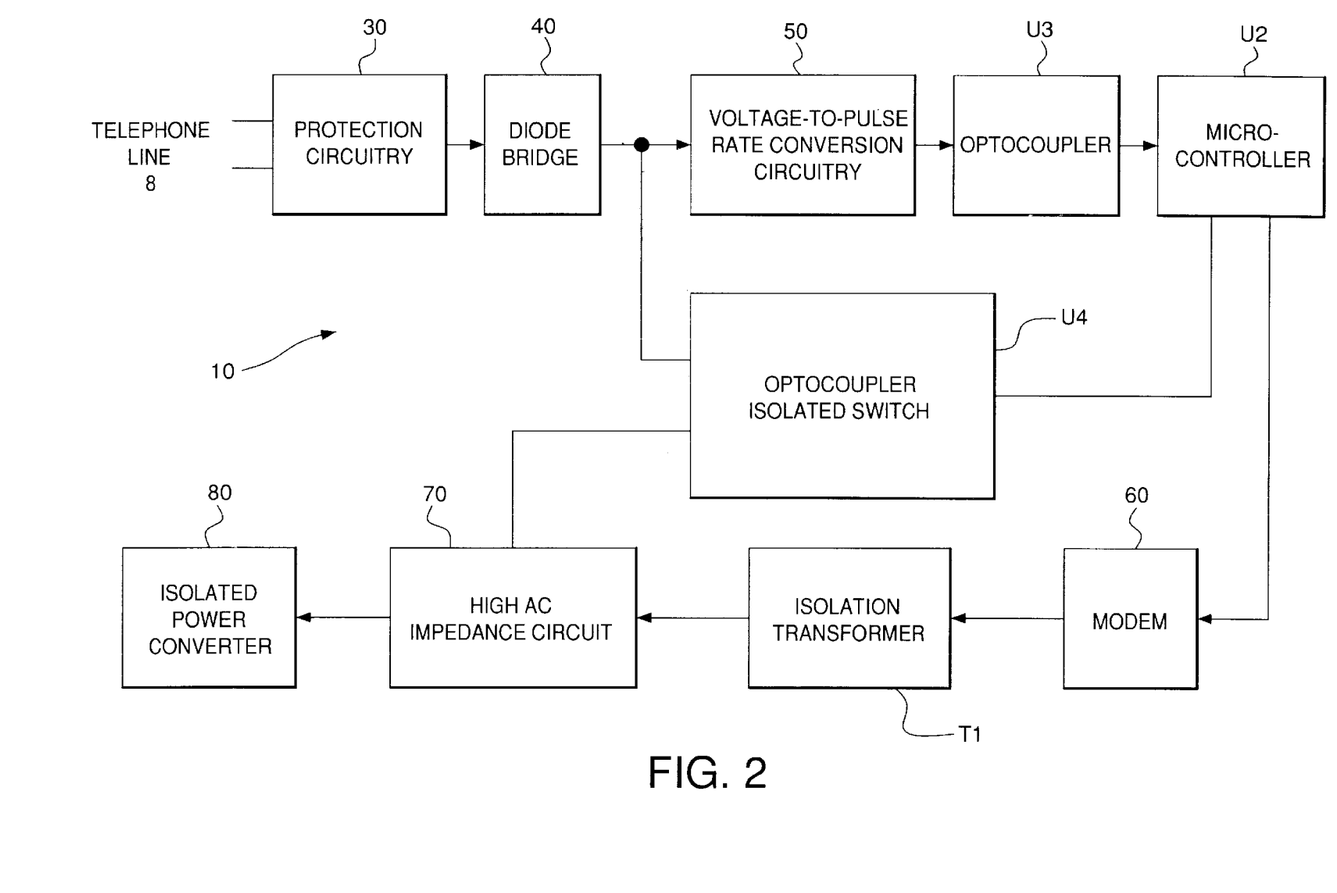
FIG. 2 is a block diagram of an embodiment of the inventive MIU telemetry device.

Turning now to the drawings and referring first to FIG. 2, there is shown a block diagram of the inventive MIU telemetry device 10 having circuit components that are used to monitor the static and dynamic on/off hook conditions of the telephone line 8. The signal from telephone line 8 is applied first to protection circuitry 30 and a diode bridge 40, and the rectified signal is then applied to voltage-to-pulse rate (V/PR) conversion circuitry 50. This circuitry stores the signal voltage and converts it into a stream of pulses as capacitive components periodically charge and discharge. The stream of pulses output by the V/PR conversion circuitry 50 is utilized by an optocoupler device U3 to generate a stream of binary signals that is provided, in turn, to a microcontroller U2. The microcontroller U2 includes firmware that enables a determination of the on/off hook condition of the telephone line 8 based upon the stream of binary signals received from the optocoupler U3. This determination of the on/off hook condition is ultimately utilized by the microcontroller U2 to control the timing of communications to and from the host computer 4 (FIG. 1A). For example, whenever it is determined that the telephone line 8 is off-hook (i.e., that the customer is using the telephone 12 or another telephone device 20), the microcontroller U2 will prevent use of the telephone line for communications between itself and the host computer.

During all periods of communication (via the telephone line 8) between the microcontroller U2 and the host computer 4, an optocoupler isolated switch U4 is turned on. This affects the charging period for components in the voltage-to-pulse rate conversion circuitry 50, and thus alters the waveform of the signals that are output by the optocoupler U3 and provided to the microcontroller U2. By means of additional stored firmware, the microcontroller uses this altered waveform to determine when changes occur in the dynamic on/off hook condition of the telephone line 8. Accordingly, whenever the microcontroller determines that a customer telephone 12 or other telephone device 20 has come off-hook while the MIU telemetry device 10 is carrying on an exchange with the host computer 4, the microcontroller will immediately cause the telemetry device to hang up and relinquish the phone line.

The microcontroller U2 communicates with the host computer 4 via a modem 60, an isolation transformer T1 and a high AC impedance circuit 70. The high AC impedance circuit allows the phone line power (which is DC) to go through it to power an isolated power converter 80 that powers the entire unit during a communication, since it has very low DC impedance. Meanwhile, this same circuit 70 shows a high impedance to the AC signal from the transformer T1, with the result that the modem communication signal does not lose too much due to this DC pass.

Figure 3:
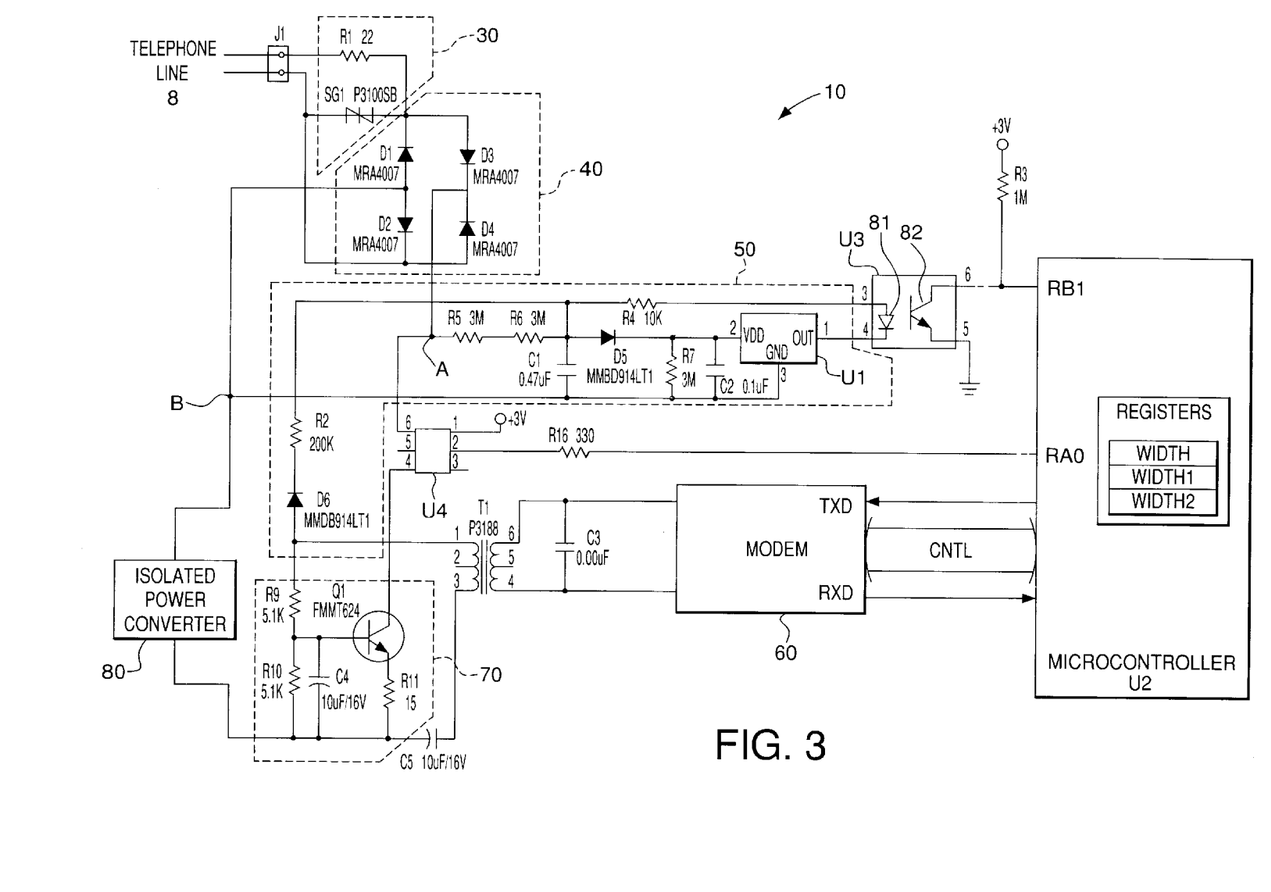
FIG. 3 is a schematic circuit diagram of an embodiment of the inventive MIU telemetry device.

Turning now to FIG. 3, there is shown a detailed schematic of the on/off hook detection circuitry of the MIU telemetry device 10 illustrated in FIG. 2. A conventional telephone connector J1 couples the device to the subscriber's telephone line 8. Received signals are immediately coupled to a pair of protection circuits—specifically, a 22Ω resistor R1 (which limits possible large transient currents) and a surge protector SG1 (which absorbs transient high voltage). Next, the phone signals are passed through a diode rectifier bridge 40 formed by diodes D1–D4. This rectification causes node A in the circuit to always be negative and node B to always be positive (regardless of the polarity of the phone signal).

The FCC requires a 5 MΩ minimum on-hook resistance for devices connected to the telephone network. In the MIU telemetry device 10, a pair of series-connected resistors (R5 and R6) meet this requirement and provide higher voltage sustainability. Current passing through the resistors R5, R6 charges a first capacitor C1. The voltage across the first capacitor C1 charges a second capacitor C2 through a diode D5. A low power voltage detector U1 having an open drain output (such as Panasonic component MN13822C) continuously measures the voltage on the second capacitor C2. When the input voltage on the VDD pin of this detector U1 exceeds a preset threshold level V+(in a preferred embodiment, 2.05V), the output becomes logic "low." Otherwise, the output is in a high impedance state.

Thus, when the voltage on the second capacitor C2 charges up to the threshold level of the voltage detector U1, the output becomes "low," allowing current to flow through a limiting resistor R4 and power a light-emitting diode 81 in an optocoupler U3 (for example, a PS2701-2 chip from NEC). The emitted light from this LED turns on a phototransister 82 in the optocoupler, causing the signal on the connected RB1 input of a microcontroller U2 (preferably a Microchip Technology Inc. PIC16LC67 microcontroller) to be pulled down to a logic "low" level.

Once the optocoupler U3 is "on," the first capacitor C1 is discharged through the limiting resistor R4, the LED 81 in the optocoupler U3 and the output of the voltage detector U1. This causes the voltage on the first capacitor C1 to drop. As a result, the voltage on the second capacitor C2 also drops, although not as quickly as the voltage on first capacitor C1 since the diode D5 blocks current flow (such that the discharge of second capacitor C2 occurs only through the resistor R7 and the voltage detector U1). When the voltage on the second capacitor C2 becomes lower than a second preset threshold V−(1.95V in a preferred embodiment), the output of the voltage detector U1 returns to a high impedance level. This turns off the optocoupler U3, and the signal on the RB1 pin of the microcontroller U2 returns to a logic "high" level.

Figure 4:
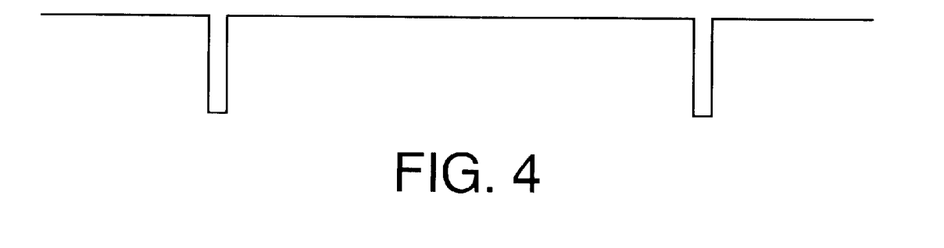
FIG. 4 is a diagram of the waveform of the on-hook signal on pin RB1 of the microcontroller U2 shown in FIG. 3.

As will be appreciated from the foregoing, the signal on the RB1 pin of the microcontroller U2 switches between a logic "high" level and a logic "low" level when the telephone 12 and the other telephone devices 20 are on-hook. The waveform for this on-hook signal is illustrated in FIG. 4. The charging time for the second capacitor C2 (through resistors R5 and R6) establishes the period of the "high" state in the waveform, and the discharging time for the same capacitor (through the resistor R7 and the voltage detector U1) establishes the "low" state period in the waveform.

When periodic "low" states are detected on pin RB1, the microcontroller U2 recognizes that an on-hook condition exists and that the telephone line 8 is available to the MIU telemetry device 10 for communications with the host 4. In contrast, when the telephone 12 or another telephone device 20 is off-hook, the phone line voltage drops below 15V. Under this condition, the voltage on the second capacitor C2 (i.e., the VDD input of the voltage detector U1) cannot reach the threshold level V+. Therefore, the signal on pin RB1 of the microcontroller cannot go to the logic "low" level. In the absence of periodic "low" signals on pin RB1, the microcontroller recognizes an off-hook condition and does not permit the MIU telemetry device 10 to initiate a communication with the host 4.

Whenever the MIU telemetry device 10 initiates a call or is in communication with the host, an optocoupler isolated switch U4 (for example, an International Rectifier photovoltaic relay, PVT412LS) is turned on and the telephone line voltage drops to less than 12V. With the switch U4 on, a diode D6 and a resistor R2 become part of the charging circuit for the capacitors C1 and C2. Because resistor R2 has much lower resistance than the series connection of the resistors R5 and R6, this channel provides a substantially higher charging current, which allows the voltage on the second capacitor C2 to exceed the threshold voltage V+ of the voltage detector U1, even though the phone line voltage is less than 12V.

Figure 5:
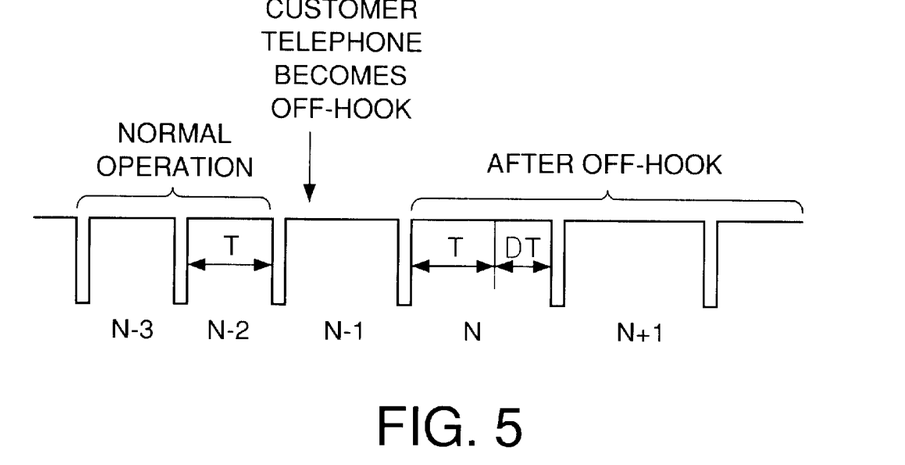
FIG. 5 is a diagram of the waveform of the dynamic signal on pin RB1 of the microcontroller U2 shown in FIG. 3, which illustrates the change in the period of this signal as a customer picks up the telephone receiver.

FIG. 5 illustrates the waveform of the signal on pin RB1 of the microcontroller U2 when the telemetry device is communicating. The left portion of FIG. 5 illustrates the waveform under normal communication conditions (i.e., when the telemetry device is communicating with the host and all other telephone devices are on-hook), and the right portion illustrates the altered waveform that results from a customer telephone device becoming off-hook. As shown for the on-hook condition (namely, cycles N−3 and N−2), a period T corresponds to the logic "high" portions of the waveform. Then, when the customer picks up the telephone receiver, the phone line voltage drops by several volts, which causes the period of the waveform to lengthen. Specifically, as shown in FIG. 5 in regard to cycles N and N+1, the period for the logic "high" portions of the waveform lengthens to T+ΔT. The microcontroller detects this change in the waveform period, and thus recognizes that a customer telephone device has become off-hook. The microcontroller reacts by immediately causing the MIU telemetry device to release the phone line so that the customer can proceed with the call.

Figure 6:
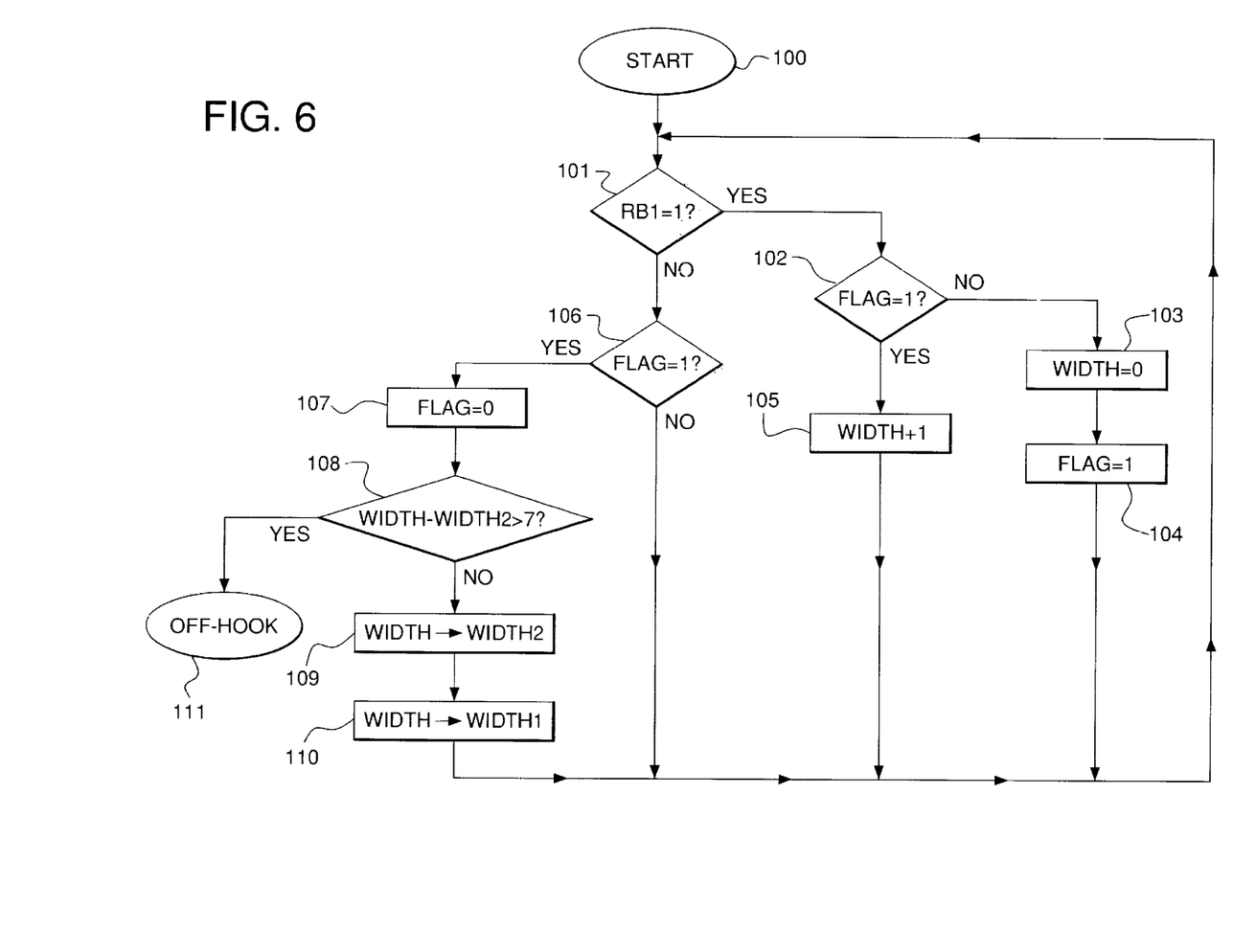
FIG. 6 is a flowchart of the firmware operation in the microcontroller U2 for detecting a dynamic off-hook condition.

FIG. 6 is a flowchart of the firmware utilized by the microcontroller U2 for this dynamic off-hook detection. Essentially, the microcontroller U2 monitors the length of time between logic "low" levels for the signal on pin RB1. As soon as the MIU telemetry device 10 initiates communication over the telephone line 8 with the host computer 4, the microcontroller U2 starts this monitoring procedure (step 100 in FIG. 6). First, a determination is made (at step 101) whether the level of the RB1 signal is "high" (i.e., logic "1"). If so, the value of a binary system flag is next determined (step 102). If the flag is set at "0," indicating that the level of RB1 has just changed from "low" to "high," the value saved in a first register (WIDTH) in the microcontroller U2 is reset to zero (step 103) and the flag value is changed to "1" (step 104). The microcontroller then repeats the determination of the logic level of RB1 (at step 101), and if the level is still "high" (and since the flag has now been set to "1") the value in the register WIDTH is incremented by one (step 105). This sequence of steps continues until the logic level of RB1 again goes "low," by which time the register WIDTH will have been incrementally increased to correspond with the number of cycles made by the microcontroller U2 while the level of RB1 remained "high"—for example, WIDTH= 20 if twenty cycles occurred.

The drop of the signal on pin RB1 to a logic "low" level is detected at step 101, and then at step 106 it is determined that the flag value momentarily remains set at "1." Next, the flag value is changed to "0" (step 107), indicating that the RB1 level has again changed. At step 110, the value in the register WIDTH is saved in another register (WIDTH1) in the microcontroller U2.

This same sequence of steps is repeated the next time the level of the signal on pin RB1 again goes "high," and, ultimately, the value previously saved in the register WIDTH1 is saved in still another register (WIDTH2) in the microcontroller U2 (step 109) and the new value in the register WIDTH is saved in the register WIDTH1 (step 110).

As will be appreciated, this procedure repeats continuously such that, at any time, the register WIDTH contains a saved value corresponding to the length of the most-recently-occurring logic level "high" period for the signal on RB1, the value saved in the register WIDTH1 corresponds to the length of the RB1 "high" period that occurred just one cycle before, and the value saved in the register WIDTH2 corresponds to the length of the RB1 "high" period that occurred two cycles before. For example, referring to the RB1 waveform in FIG. 5, if the value in the register WIDTH corresponds to the length of the most recently occurring period (period N), then the values saved in the registers WIDTH1 and WIDTH2 will correspond to periods N−1 and N−2, respectively.

At step 108 (FIG. 6), a comparison is made between the values saved in the registers WIDTH and WIDTH2 (which correspond to the lengths of the two non-consecutive periods N and N−2, respectively). If the difference is less than a preset quantity (e.g., 7), the microcontroller U2 understands that the telephone 12 and the other telephone devices 20 remain on-hook, and the register values are progressively updated (steps 109 and 110) in preparation for the next "high" period for the signal on pin RB1. On the other hand, if the difference at step 108 is determined to exceed the preset quantity, the microcontroller U2 concludes that a customer telephone or other device has been taken off-hook (step 111). In that event, the MIU device immediately releases the telephone line so that the customer can proceed with the call.

Returning to FIG. 3, shown connected to the microcontroller U2 is a modem 60 (which is further connected to the telephone line 8 via an isolation transformer T1). Microcontroller U2 configures the operation of modem 60 by sending instructions to set the baud rate and other communication parameters via control lines (CNTL), thereby preparing it for a telemetry transaction. Once connected to a remote host, data sent from the host to the MIU telemetry device 10 appears on the receive data (RXD) output of modem 60, while data to be sent from MIU telemetry device 10 to one of the hosts is placed on the transmit data (TXD) input of the modem 60. Since both transmit and receive data are accessible to microcontroller U2, the telemetry device is capable of sending data to and receiving data from a host. Thus, modem 60 is a hardware peripheral to the microcontroller which interfaces the telemetry device to, and facilitates the transport of, telemetry data over the telephone line 8.

A transistor Q1, three resistors R9–R11 and a capacitor C4 form a high AC impedance circuit 70. This circuit, because it has very low DC impedance, allows the telephone line power (which is DC) to go through it to power the conventional isolated power converter 80 that powers the whole unit during communications. The circuit, however, shows a very high AC impedance to the AC signal from the transformer T1, such that the modem communication signal does not lose too much power.

What is claimed is:

1. A telemetry device for collecting information at a remote location and transmitting the information over a telephone line to a host location, wherein the telephone line has an associated voltage signal that varies in accordance with an off-hook status of one or more user devices connected to the telephone line, the telemetry device comprising:

a monitoring circuit coupled to the telephone line which periodically generates a voltage signal having an amplitude that is representative of the telephone line voltage level; and a processing circuit which collects information at a remote location, and which receives the voltage signal as an input and utilizes the voltage signal to determine the off-hook status of the user devices and thereby control the transmission of the collected information over the telephone line so as to not interfere with usage of the telephone line by the user devices, said processing circuit including a pulse-generating circuit which converts voltage signals from the monitoring circuit into a stream of binary signals, wherein each binary signal has either a first logic level or a second logic level, and a microcontroller which receives and analyzes the stream of binary signals, and which prevents the telemetry device from transmitting the collected information over the telephone line during periods when a determination is made that the stream has ceased having binary signals of both said first logic level and said second logic level.

2. The telemetry device of claim 1, wherein the pulse-generating circuit comprises a voltage detector which receives the voltage signals from the monitoring circuit, and which generates binary output signals in response thereto, wherein the binary output changes from the second logic level to the first logic level when the amplitude of the voltage signal exceeds an upper threshold value and changes back to the second logic level when the amplitude of the voltage signal drops below a lower threshold value.

3. The telemetry device of claim 2, wherein the pulse-generating circuit further comprises an optocoupler interposed between the voltage detector and the microcontroller.

4. A telemetry device for collecting information at a remote location and transmitting the information over a telephone line to a host location, wherein the telephone line has an associated voltage signal that varies in accordance with an off-hook status of one or more user devices connected to the telephone line, the telemetry device comprising:

a monitoring circuit coupled to the telephone line which periodically generates a voltage signal having an amplitude that is representative of the telephone line voltage level; and a processing circuit which collects information at a remote location, and which receives the voltage signal as an input and utilizes the voltage signal to determine the off-hook status of the user devices and thereby control the transmission of the collected information over the telephone line so as to not interfere with usage of the telephone line by the user devices, said processing circuit including a pulse-generating circuit which converts voltage signals from the monitoring circuit into a stream of binary signals, wherein each binary signal has either a first logic level or a second logic level, and wherein the binary signals having said first logic level are of variable duration, and a microcontroller which receives and analyzes the stream of binary signals at least by progressively comparing the respective durations of two nonconsecutive binary signals having said first logic level, one of which is the most recently occurring binary signal having said first logic level, wherein the microcontroller causes the telemetry device to stop transmitting collected information over the telephone line upon determining that the compared durations differ by more than a predetermined amount.

5. The telemetry device of claim 4, wherein the pulse-generating circuit comprises a voltage detector which receives the voltage signals from the monitoring circuit, and which generates binary output signals in response thereto, wherein the binary output changes from the second logic level to the first logic level when the amplitude of the voltage signal exceeds an upper threshold value and changes back to the second logic level when the amplitude of the voltage signal drops below a lower threshold value.

6. The telemetry device of claim 5, wherein the pulse-generating circuit further comprises an optocoupler interposed between the voltage detector and the microcontroller.

7. The telemetry device of claim 4, wherein the monitoring circuit comprises:

a capacitor that is periodically charged by a current from the telephone line to provide the voltage signal;

at least first and second resistive pathways for providing said current to charge the capacitor; and an optocoupler switch which is coupled to the second resistive pathway and is controlled by the microcontroller, wherein the switch is turned on and the second resistive pathway is active when the telemetry device is transmitting collected information over the telephone line.

8. A method for monitoring the off-hook status of a user device connected to a telephone line, wherein the telephone line has an associated voltage level that varies in accordance with the off-hook status of the user device, the method comprising the steps of:

coupling the telephone line to a monitoring circuit so that the current from the telephone line is provided to components in the monitoring circuit;

generating periodic voltage signals using the current from the telephone line, wherein the amplitude of the voltage signals is representative of the telephone line voltage level;

converting the voltage signals into a stream of binary signals, wherein each binary signal has either a first logic level or a second logic level;

determining whether the stream of binary signals comprises alternating first logic level signals and second logic level signals; and concluding that a user device is off-hook if the stream consists only of binary signals having said first logic level.

9. The method of claim 8, wherein the converting step further comprises generation of a stream of binary signals in which the binary signals having said first logic level are of variable duration; and wherein the determining step further comprises a step of progressively comparing the respective durations of two non-consecutive binary signals having said first logic level, one of which is the most recently occurring binary signal having said first logic level; and wherein said method further comprises a step of concluding that a user device has become off-hook if the compared signal durations differ by more than a predetermined amount.

* * * * *